(12) United States Patent
Yadav

(10) Patent No.: US 8,526,763 B2
(45) Date of Patent: Sep. 3, 2013

(54) SEAMLESS IMAGE COMPOSITION

(75) Inventor: Vikas Yadav, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 249 days.

(21) Appl. No.: 13/118,189

(22) Filed: May 27, 2011

(65) Prior Publication Data

US 2013/0121618 A1    May 16, 2013

(51) Int. Cl.
*G06K 9/32* (2006.01)
(52) U.S. Cl.
USPC .............................. 382/294; 348/36; 348/263
(58) Field of Classification Search
USPC ................... 382/294; 348/36, 263
See application file for complete search history.

(56) References Cited

U.S. PATENT DOCUMENTS

| | | | |
|---|---|---|---|
| 7,142,723 B2 | 11/2006 | Kang et al. | |
| 7,239,805 B2 * | 7/2007 | Uyttendaele et al. | 396/222 |
| 7,646,400 B2 * | 1/2010 | Liow et al. | 348/36 |
| 7,778,487 B2 * | 8/2010 | Cohen et al. | 382/284 |
| 7,778,491 B2 | 8/2010 | Steedly et al. | |
| 7,796,812 B2 * | 9/2010 | Pitie et al. | 382/162 |
| 7,839,422 B2 * | 11/2010 | Agarwala | 345/629 |
| 7,844,133 B2 * | 11/2010 | Spence et al. | 382/294 |
| 7,889,948 B2 | 2/2011 | Steedly et al. | |
| 8,189,959 B2 * | 5/2012 | Szeliski et al. | 382/284 |
| 2005/0013501 A1 | 1/2005 | Kang et al. | |
| 2006/0177150 A1 * | 8/2006 | Uyttendaele et al. | 382/284 |
| 2008/0089581 A1 * | 4/2008 | Pitie et al. | 382/162 |
| 2008/0143744 A1 * | 6/2008 | Agarwala | 345/629 |
| 2009/0263045 A1 * | 10/2009 | Szeliski et al. | 382/284 |
| 2010/0238164 A1 | 9/2010 | Steedly et al. | |

OTHER PUBLICATIONS

Gradient domain Image Blending—Devices, Xiong et al., IFCS-SITE, 2010, pp. 293-306.*

* cited by examiner

*Primary Examiner* — Jayesh A Patel
(74) *Attorney, Agent, or Firm* — Finch & Maloney PLLC

(57) ABSTRACT

Seamless image compositions may be created. A plurality of images may be received, one image being a base image and the remaining image or images being source images. A selection may be received of one or more regions of one or more of the sources images to be copied onto the base image. An input may be received setting a blend parameter for each of the selected regions. The plurality of images may be blended together into a composite image by matching image gradients across one or more seams of the composite image. The image gradients may be based on the blend parameters. In one embodiment, input may be received to set a modified blend parameter for at least one of the selected regions and the plurality of images may be re-blended into a composite image in a similar manner but using the modified blend parameter.

18 Claims, 18 Drawing Sheets

SEAMLESS IMAGE COMPOSITION

BACKGROUND

Creating seamless image compositions is a difficult image processing problem. The problem is magnified where the composite is created from images with drastically different image characteristics (e.g., color saturation, image contrast, color intensity, image luminance, etc.). Other factors may also negatively impact the quality of image compositions. In such difficult image compositions, results are typically poor near the boundaries of the composite image. Difficult image composition scenarios include: images with many differentials, compositing a day time image with a night time image, or stitching together high-exposed, medium-exposed, and low-exposed images.

SUMMARY

This disclosure describes techniques and structures for creating seamless image compositions. In one embodiment, a plurality of images may be received. An indication of one of the plurality of images as a base image may be received with images not indicated being referred to as source images. A selection may be received of one or more regions of one or more of the sources images to be copied onto the base image. An input may be received setting a blend parameter for each of the selected regions. In one embodiment, the blend parameter includes a blend amount. The plurality of images may be blended together into a composite image by matching image gradients across one or more seams of the composite image. In one embodiment, the image gradients may be based on the blend parameters. In one embodiment, input may be received to set a modified blend parameter for at least one of the selected regions. The plurality of images may be re-blended into a composite image by matching image gradients across one or more seams of the composite image with the image gradient corresponding to the at least one selected region being based on the modified blend parameter.

In one non-limiting embodiment, blending the plurality of images may include storing image data into a buffer for each of the plurality of images. Blending may further include storing a blend map for each of the selected regions based on each selected region's corresponding blend parameter. Blending may further include computing modified image data based on the stored image data and stored blend maps for each of the selected regions. Blending may also include computing a composite vector field that includes an image gradient for: the base image, each region of the modified image data, and a plurality of boundaries that exist at a plurality of regions of the modified image data. Blending may additionally include generating composite image data by matching a plurality of gradients of the composite image to the composite vector field.

Figure 1:
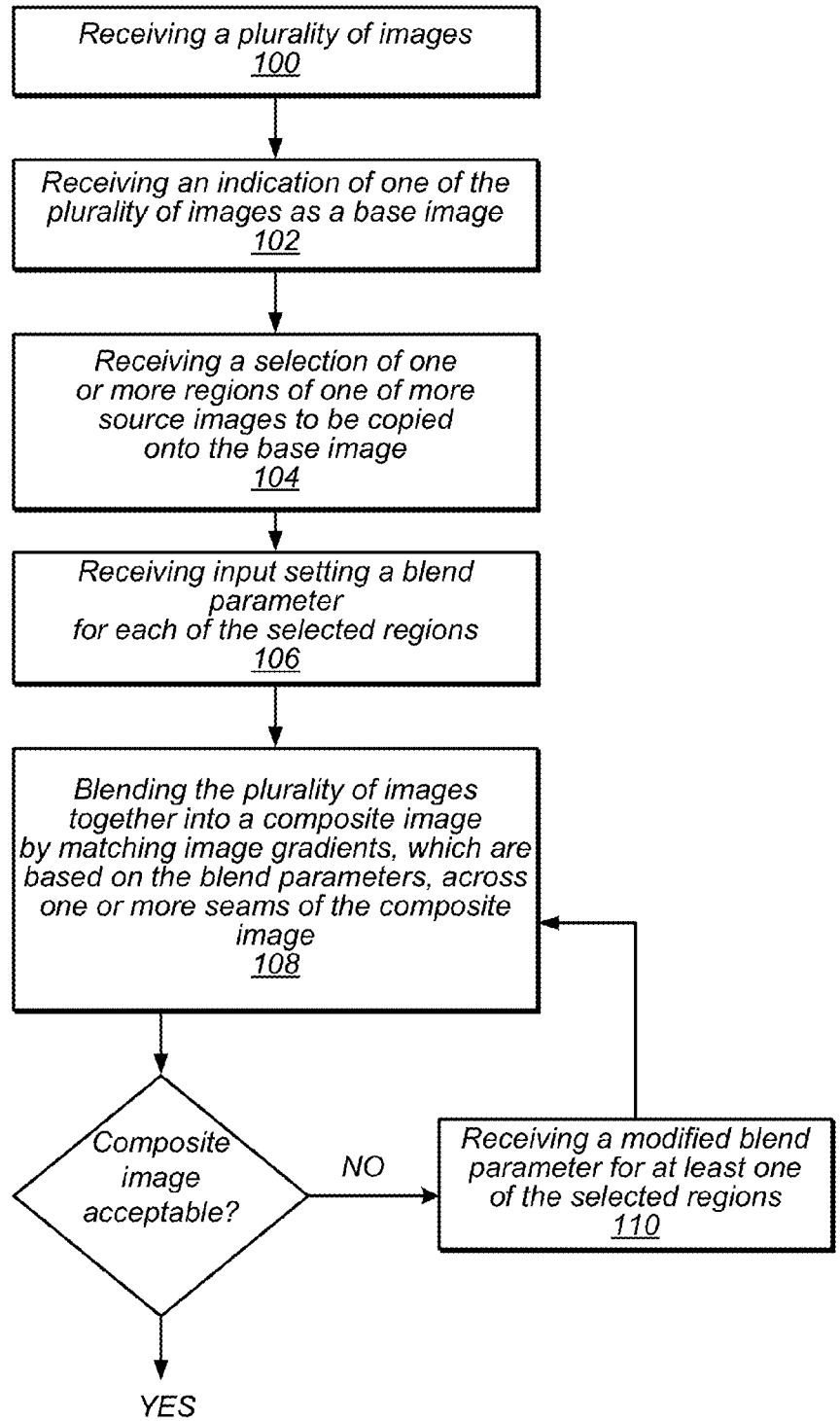
FIG. 1 is a flowchart of an example of seamless image composition, according to some embodiments.

While the disclosure is described herein by way of example for several embodiments and illustrative drawings, those skilled in the art will recognize that the disclosure is not limited to the embodiments or drawings described. It should be understood, that the drawings and detailed description thereto are not intended to limit the disclosure to the particular form disclosed, but on the contrary, the intention is to cover all modifications, equivalents and alternatives falling within the spirit and scope of the present disclosure. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

"First," "Second," etc. As used herein, these terms are used as labels for nouns that they precede, and do not imply any type of ordering (e.g., spatial, temporal, logical, etc.). For example, for an image blending module receiving multiple input images, the terms "first" and "second" images can be used to refer to any two of the multiple images. In other words, the "first" and "second" images are not limited to logical images 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Various embodiments of methods and apparatus for seamless image composition are described. Some embodiments may include a means for blending a plurality of images together. For example, a blending module may blend a plurality of images together into a composite image including matching image gradients across one or more seams of the composite image, with the image gradients based on received blend parameters. The blending module may, in some embodiments, be implemented by program instructions stored in a computer-readable storage medium and executable by one or more processors (e.g., one or more CPUs or GPUs) of a computing apparatus. The computer-readable storage medium may store program instructions executable by the one or more processors to cause the computing apparatus to perform blending a plurality of images together into a composite image including matching image gradients across one or more seams of the composite image, with the image gradients based on received blend parameters, as described herein. Other embodiments of the blending module may be at least partially implemented by hardware circuitry and/or firmware stored, for example, in a non-volatile memory.

Turning now to FIG. 1, one embodiment of performing seamless image composition is illustrated. While the blocks are shown in a particular order for ease of understanding, other orders may be used. In some embodiments, the method of FIG. 1 may include additional (or fewer) blocks than shown. Blocks 100-110 may be performed automatically or may receive user input.

As illustrated at 100, a plurality of images (e.g., HDR, JPEG, BMP, etc.) may be received to be composited, or stitched, together. The plurality of images may differ in a number of ways. The images may be drastically different images, may be differently contrasted, may be differently exposed, may be at different time frames when there is a relative motion in the images, and they may be multiple images of the same scene at different exposure values (e.g., HDR photography). In one embodiment, the plurality of images may include images that include the same content but were taken at different exposures. For example, the plurality of images may include a high-exposed image, a medium-exposed image, and a low exposed image, with each of the images including the same content. As another example, the plurality of images may include a daytime image and a nighttime image, each of which may include substantially the same content. In some embodiments, the plurality of images may differ in some content yet also include some of the same content. For instance, one of the plurality of images may be a building on a city street while another of the plurality of images may include a person in front of the same building on a city street but with a car partially obstructing the building. In some embodiments, the plurality of images may differ in all content. As an example, one of the plurality of images may include a building on a city street while another of the plurality of images may include a person standing in front of a different building. In some embodiments, one or more of the plurality of images may be derived from videos (e.g., frames of videos). For instance, an object from a still image may be composited into one or more video frames. As another example, an object from multiple frames of a video may be selected to be composited onto a base image to create a single composite image that shows an object in motion (e.g., a person running across a field with multiple instances of the person appearing in the single composite image to demonstrate motion over time in a single image) In various embodiments, the plurality of images may be downsampled versions of original full-size, high-resolution images. In other embodiments, the full-size images may be received at block 100 and may optionally be downsampled after their receipt.

At 102, an indication of one of the plurality of images as a base image may be received. The remaining images of the plurality of images may be referred to as non-base images, or source images. For instance, in an example in which three received images were received at block 100, one may be selected as the base image and the remaining images may be referred to as source images. In some embodiments, the indicated base image may be stored, for example, in a buffer.

As shown at 104, a selection of one or more regions of one or more of the source images may be received. The selected regions may indicate regions of the source image that may be copied onto the base image. For instance, consider an example in which the base image is a cityscape and a single source image includes an image of a woman. The selection of one or more regions of the source image may include the selection of the woman to be copied onto the base image. As another example, consider three input images. One of those images may be selected at 102 to be the base image and from each of the other two images (source images), one or more regions may be selected. For example, a building may be selected from one source image and the sky may be selected from the other source image. In one embodiment, selected regions from different source images may overlap and both be composited onto the base image (e.g., stacking images). In some embodiments, the selected regions may be stored, for example, in a buffer. The stored regions may be used at block 108, among other blocks. In various embodiments, selection of the one or more regions may be made via a brush, wand, lasso, or other selection tool provided by a user interface. The brush may be manipulated by a user to draw a line, circle, point, or other shape via a cursor control device such as a mouse, trackball, touchpad, or keyboard. Other examples that may allow for selection of the one or more regions include a stylus, finger, or other implementation may be used to draw the stroke on a touch-sensitive surface of a touch-enabled input device, such as a touchpad, tablet, mobile device or touch-sensitive screen.

To identify a region in the source image from an input selection applied to the source image, some embodiments may employ any one of several image processing algorithms, known collectively as graph cut algorithms, to segment the source image into two regions (the region specified by the stroke is one region, and the rest of the image is the other region). However, other types of image processing algorithms may be used in other embodiments to locate region(s) in the source image. In some embodiments, pixel color values from pixels specified by the selection may be obtained and used to segment an image into two regions. Some embodiments may use other pixel values, in addition to or instead of color value, for example hue or intensity values, in segmenting the image. Some embodiments may provide one or more user interface elements via which the user may specify what pixel values or range of pixel values are to be used to segment an image. Some embodiments may provide one or more user interface elements via which the user may adjust one or more segmentation parameters, such as thresholds to be used when segmenting an image.

In some embodiments, one or more characteristics of the selection applied by the user to the source image may be used to specify parameters used in the segmentation. For example, in some embodiments utilizing a brush to indicate selection of a region, the width of the brush tip used to draw a stroke may be used to specify one or more segmentation parameters. In some embodiments, for example, a wider brush tip may specify that a wider range of pixel values is to be used in identifying pixels to be included in the region, while a narrower brush tip may specify a narrower range; thus, a wider brush tip may result in a larger region than a narrower brush tip. Some embodiments may provide one or more user interface elements via which the user may set or change the width of the brush tip to be used when drawing a stroke. As another example, in some embodiments, the length of the stroke may be used to specify one or more segmentation parameters. In some embodiments, the width of the brush tip and the length of the stroke may both be used to specify one or more segmentation parameters. Other characteristics of the stroke, for example stroke speed and/or direction, or even the color used for the stroke, may be used specify one or more segmentation parameters in some embodiments.

Some embodiments may provide one or more user interface elements via which a user may optionally view a visual indication of the various regions in a composite image, for example by shading, coloring, outlining, or texturing the regions, with different regions shaded, outlined, or textured differently to indicate that the regions are sourced from different images.

As illustrated at 106, an input may be received to set a blend parameter for each of the selected regions. Each respective blend parameter may include a blend amount for the selected region of the source image. The blend parameters may indicate how the entire region is to be blended and is not limited to how the edge is to be blended. The blend amount may range from 0% (opaque) to 100% (fully transparent). As an example, a user may want to composite a portion of one image on top of the base image but would like for the overall resulting image to appear more like the base image. In such an example, a higher blend parameter value may correspond to a lesser weighting (more transparent) of the selected portion and therefore a greater weighting of the base image. On the other hand, a higher blend parameter value may correspond to a lesser weighting of the selected portion and a greater weighting of the base image. Choosing a blend parameter that weights the base image higher (e.g., 90% base/10% source, 80/20, etc.) may help reduce ghosting, for example, when a selected region of the source image includes a person in the foreground moving her hand. In some embodiments where selected regions of different source images may overlap, a separate blend parameter may be received for the selected region from each source image. As one example, if a blend parameter scale is 0 to 100, the sum of the blend parameters may not exceed 100. Thus, if the blend parameter for an overlapping region of a source image is 40, then the blend parameter for the overlapping region of the other source image may not exceed 60. Note that overlapping regions means that the regions overlap at least in some pixels and does not require a complete overlap of the selected regions.

At 108, the plurality of images may be blended together into a composite image. In one embodiment, blending may include matching image gradients across one or more seams of the composite image. In some embodiments, the image gradients may be based on the blend parameters. In one embodiment, pixel values of the selected region or regions may be blended with pixel values of the base region and a gradient may be computed based on those blended values. Blending may be performed according to various techniques, such as alpha blending, color saturation blending, layering, etc. In some embodiments, blending may include computing modified image gradients in various regions and solving a modified Poisson equation. In one embodiment, image gradients may be computed at region boundaries. At the actual boundaries, the gradient may be averaged at either side of the boundary.

In one embodiment, blending may include computing one or more color gradients for the composite image (e.g., one in each the x-direction and y-direction). The computed gradients may be uniform across the various regions (e.g., selected region of one image and other regions in the base image) of the composite image. Continuing the above example with a base image that includes a cityscape and building and a source image that includes a woman, the gradients may be blended together to create a uniform distribution such that the gradient for region A of the base image and the gradient for region B of the second image may be uniform. Assume that the base image has a gradient $\Delta x1$ and that the second image has a gradient $\Delta x2$. The blending of block 108 may soften the difference and spread the delta over neighboring areas to obtain a uniform and slow gradation. As such, the human eye may not be able to perceive the slow gradation and the boundaries may not appear as sharp. Spreading the gradient through the whole image may additionally minimize any blurring at the edges yet also minimize sharp transitions in the gradient at the edges.

In various embodiments, blending may be performed for the whole image or blending may be performed in a localized area (e.g., on or near edges/boundaries that were created from the compositing). When the blending is performed in a localized area, the delta may still be spread over a large area beyond the area containing the edges.

In one embodiment, blocks 102-110 may be performed on downsampled versions of the plurality of images. Further the actual images received at block 100 may be downsampled versions of original source images. After block 108, a user may indicate that the composite image is acceptable. In some embodiments, the initial blending and any optional blending refinement (at block 110) may be performed on downsampled images until a user indicates that the blending is acceptable. At that point, acceptable blending may be performed on the full-size (high-resolution) images. The resulting composite image may be stored in a buffer (e.g., a two-dimensional area buffer), transmitted, and/or may be provided for display.

A user may indicate that the composite image generated at block 108 is not acceptable. If so, as illustrated at 110, a modified blend parameter may be received for at least one of the selected regions. The modified blend parameter may include a modified blend amount for the at least one of the selected regions. For instance, consider the example above in which three input images are received: one image that is used for the sky in the composite image, one image that is used for the buildings, and one image that is used as the base image. At 110, a modified blend parameter may be received for the selected sky, the selected building, or both the selected sky and building. Assume that the original blend parameter (from block 106) for the sky included a blend amount of 60% and that the original blend parameter (from block 106) for the building included a blend amount of 30%. The blend amounts for the corresponding regions of the base image may be 40% and 70% respectively, assuming that the selected sky and building regions do not overlap. At 110, the user may modify the blend parameter for the region containing the sky to be 40% to lessen its weight in the blending and to increase the weight of the base image for that same region. Likewise, the user may modify the blend parameter for the region containing the building as well. In one embodiment, after receiving the modified blend parameter, the plurality of images may be re-blended at block 108 using the modified blend parameter along with other blend parameters (e.g., other blend parameters from block 106 or other modified blend parameters from block 110). The user may further modify one or more of the modified blend parameters. For example, after re-blending at 108, the user may again modify one or more of the blend parameters (e.g., change the blend parameter for the region containing the sky to 50%) at 110 and, in turn, re-blend again at 108. Refinement at 108-110 may occur until the user is satisfied with an acceptable composite image. In various embodiments, the refinement may occur in real-time so that a user may set the blending parameters, receive real-time feedback and dynamically make changes.

Figure 3A:
FIGS. 3A-3B illustrate examples of composite images, which may be generated according to some embodiments.
Figure 3B:
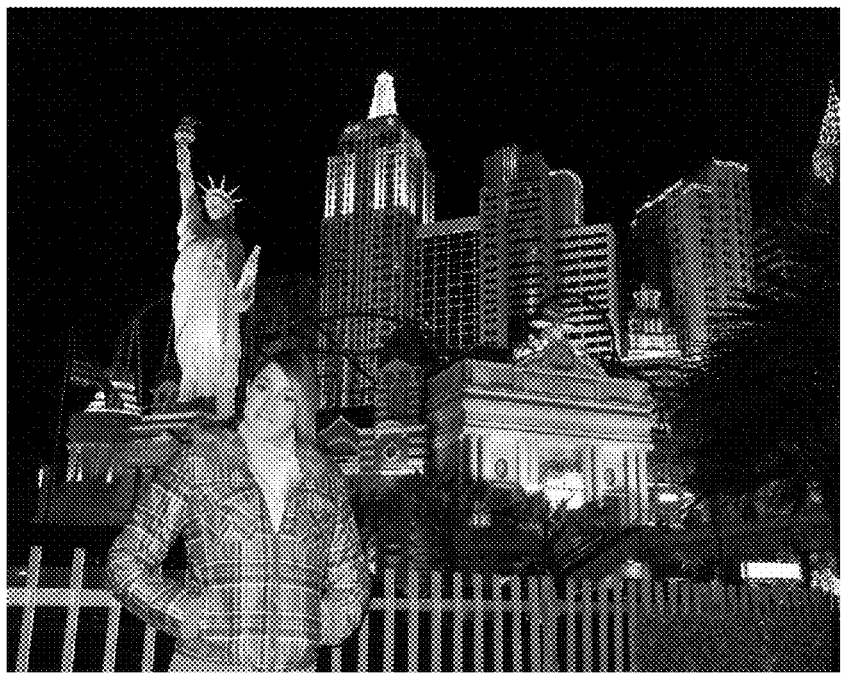

FIGS. 3A-3B illustrate examples of composite images according to the method of FIG. 1. FIG. 3A is an example of a composite image generated from two input images. The first input image includes the building and the background while the second input image includes the person. The composite image in this example was created by selecting the first image as the base image and selecting the person from the second image to be blended onto the base image. Various blend parameters may be selected and applied to reach the composite image of FIG. 3A.

FIG. 3B is another example of a composite image generated from two input images. As in FIG. 3A, the person in FIG. 3B is from one image while the background is from another image. The base image in this example is the image with the buildings and background, which was shot without using a flash. The image containing the person was shot using a flash. The composite image was created by selecting the image containing the background as the base image and the person from the source image as a region to be copied onto the base image. Further, in this example, the blend parameter for the person was set to 50% to produce a more realistic composite image. Other blend parameter values in this example may likewise create a realistic composite image.

Blending pixel values of the different images and computing a gradient based on those blended values may create seamless compositions and remove edges with minimal or no user intervention (e.g., the user does not have to enter various parameters, such as radius of the image, etc.). This may allow for seamless composites: from two drastically different images, from multiple regions from multiple differently contrasted images, from regions from multiple differently exposed images, and from images of the same object at different timeframes where there is a relative motion in the images. It may also allow for a scene composition from multiple images of the same scene at different exposure values (e.g., HDR photography). Blending in such a manner may leverage the human visual system that is highly sensitive to local contrast but is less sensitive to slowly varying luminance and chrominance changes. Allowing a user an opportunity for feedback by modifying the blend parameters may yield further enhancements to the seamless compositions.

Figure 2:
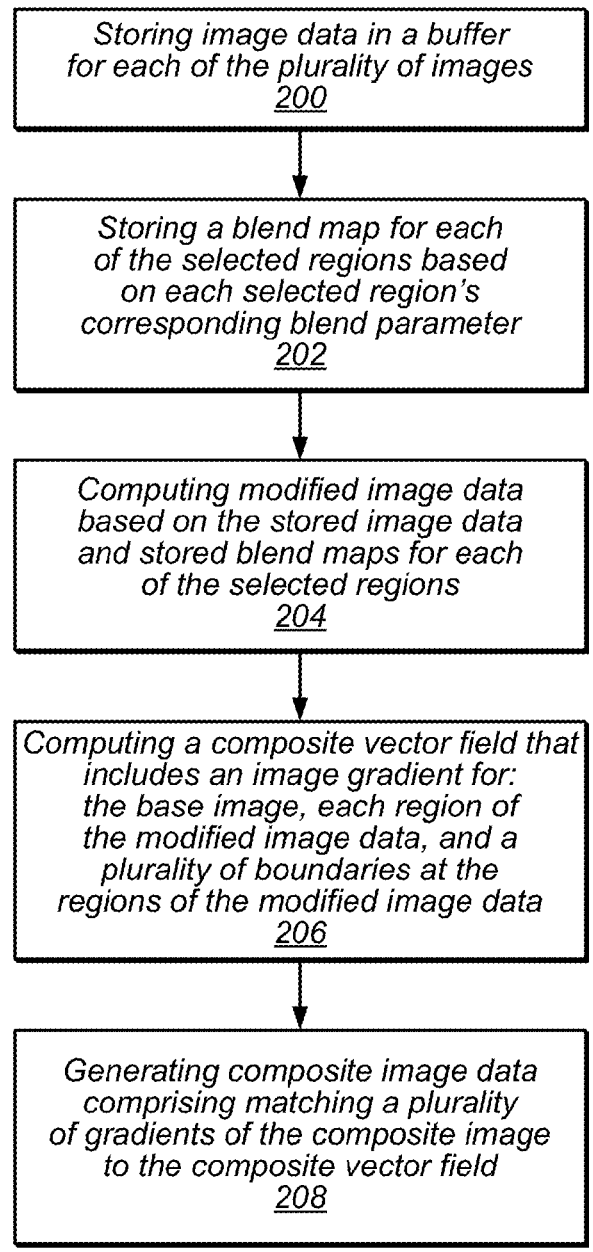
FIG. 2 is a flowchart of an example of blending a plurality of images, according to some embodiments.

Turning now to FIG. 2, one embodiment of blending a plurality of images is illustrated. While the blocks are shown in a particular order for ease of understanding, other orders may be used. In some embodiments, the method of FIG. 2 may include additional (or fewer) blocks than shown. Blocks 200-208 may be performed automatically or may receive user input. The method of FIG. 2 may be used in conjunction with the method of FIG. 1. Accordingly, a combination of some or all of the blocks of FIGS. 1 and 2 may be used in some embodiments.

As shown at 200, image data, which may include pixels, from each of the plurality of images may be stored. For example, the image data may be stored in memory buffers, such as two-dimensional area buffers or cache.

As illustrated at 202, a blend map may be stored for each of the selected regions. In some embodiments, the blend map may be based on each selected region's corresponding blend parameter. The blend map may indicate where to blend, what type of blending to perform, the amount of blending to perform, which regions are being blended, and/or their weights. For example, in a case with overlapping selected regions from different source images, the blend map may indicate to blend a region 20% from one image, 50% from another image, and 30% from a third image to create a stacking of images.

At 204, modified image data may be computed. The modified image data may be based on the stored image data and the stored blend maps for each of the selected regions. Each pixel of the modified image may come from one of the plurality of images (e.g., images A and B). For example, if image A is the base image and image B contains a person to be composited onto image A, then pixels of the modified image corresponding to the region including the person may come from image B while pixels of the modified image corresponding to the other regions may come from image A. In some embodiments, the pixels of the modified image may be determined according to some other technique (e.g., determining based on features/characteristics of the underlying image, weighted combination, etc.).

As shown at 206, a composite vector field may be computed. The composite vector field may include an image gradient for each of: the base image, each region of the modified image data, and a plurality of boundaries that exist at the regions of the modified image data. As discussed herein, there are many possibilities for choosing the gradients. For example, when compositing a region from image A into image B, the gradients inside that region may be $\nabla A$ and the colors at the boundaries may be fixed from image B. When simultaneously compositing multiple regions from multiple images, the gradient of the source image between any two pixels inside of one region may be the gradient of the source image. For pixels straddling a boundary between two regions, the gradient may be the average of the gradients of the two source images. Each horizontal and vertical gradient may specify a single linear constraint on two variables, which can be expressed as:

$$Cx=d \qquad (1)$$

where, in one embodiment, x may be of length n (one element for each pixel), and C has at most two non-zero elements per row. This system of equations may be over constrained. Thus, the solution x that minimizes Cx−d in a least squares sense may be the solution to the normal equation:

$$C^TCx=C^Td \qquad (2)$$

where the sparse, banded square matrix $C^TC$ has at most five nonzero elements per row, according to some embodiments. Because this linear system may be large, it may be solved using an iterative solver such as conjugate gradient whose inner loop performs the sparse matrix vector multiplication $C^TCx$. The sparse matrix vector multiplication may be equivalent to applying the Laplacian to x, and thus may be applied procedurally without necessarily storing $C^TC$. The initial condition x0 of the iterative solver may be set to the image that would result from simply copying colors, rather than gradients, from the source images.

Gradients for regions other than the base gradient (e.g., blended regions) may be computed in a different manner. For example, for regions consisting of an image that is blended with the base image, the gradient may be computed by considering a modified image that is a blend of the base image and other image. Consider a region (r1) from image (i1) that is 25% blended with the base image. The gradient inside r1 may be computed by considering a modified image (i'1) which is a 25% blend of image i1 and base image. Consider another example that includes multiple regions from different multiple images. For example, regions (r1, r2, and r3) from images (i1, i2, and i3) may be blended with the base image according to blend parameters 25%, 50%, and 75%, respectively. The gradients may be computed inside regions (i'1, i'2, and i'3).

As illustrated at 208, composite image data may be generated. In one embodiment, the generation may include matching a plurality of gradients of the composite image to the composite vector field that includes the image gradients computed at 206. The matching may be computed by solving a discrete gradient domain Poisson Solver with variable denoting colors of each pixel. Color gradients between source pixels and their immediate neighbors may be copied to form a composite vector field. A composite whose gradients ($\partial 1/\partial x$, $\partial 1/\partial y$) best match the composite vector field in the least squares sense may be reconstructed by solving the Poisson equation. In one embodiment, the gradient-domain Poisson equation for a single color channel of an image may be solved by re-ordering the image pixels into a vector x and solving for the x that best matches horizontal and vertical gradients: $\nabla x$, $\nabla y$. After solving the Poisson equation, a new set of gradient values may be generated, which may then be converted back to create new color values resulting in composite image data.

FIGS. 4A-4J and 5A-5D each illustrate an example workflow for creating a seamless image composition. FIGS. 4D-4I and 5A-5C illustrate an example user interface that be used to perform seamless image compositions, according to some embodiments. Referring to FIG. 4I to describe the example interface, the lower portion of the interface may include an image thumbnail preview area. As seen in FIG. 4I, three image thumbnail previews are shown. In various embodiments, thumbnails may be presented in the preview area for images that have been received or selected. The example interface also includes two panes, one on the left where a source image may be displayed, and one on the right where a base image may be displayed. The pane on the right may be updated to reflect the composite image, as is seen in FIG. 4I. The interface may include various user interface elements, such as the illustrated selection and eraser tools, a show strokes checkbox, a show regions checkbox, a blend parameter selector, and an edge blending checkbox. A selection tool may be selectable by a user to draw a stroke or strokes on a source image to indicate selection of a region. An eraser tool may likewise allow a user to remove all or a portion of the stroke or all or a portion of a selected region. Showing strokes may include showing a stroke or strokes drawn by the user on one or more of the source images. FIG. 5A illustrates an example of strokes being shown as a vertical stroke line. Showing regions may include showing a region or regions overlaid on the base image, which may be indicated in a different color, shade, etc. The example interface also includes a blend parameter selector in the form of a transparency slider. As seen in the FIGS. 4D-4I and 5A-5C, the example slider indicates a blend parameter for a selected region of a source image ranging from 0% (fully opaque) to 100% (fully transparent). Finally, the example interface shows a check box for edge blending, which when checked, permits the system to perform the seamless image composition techniques described herein.

Figure 4A:
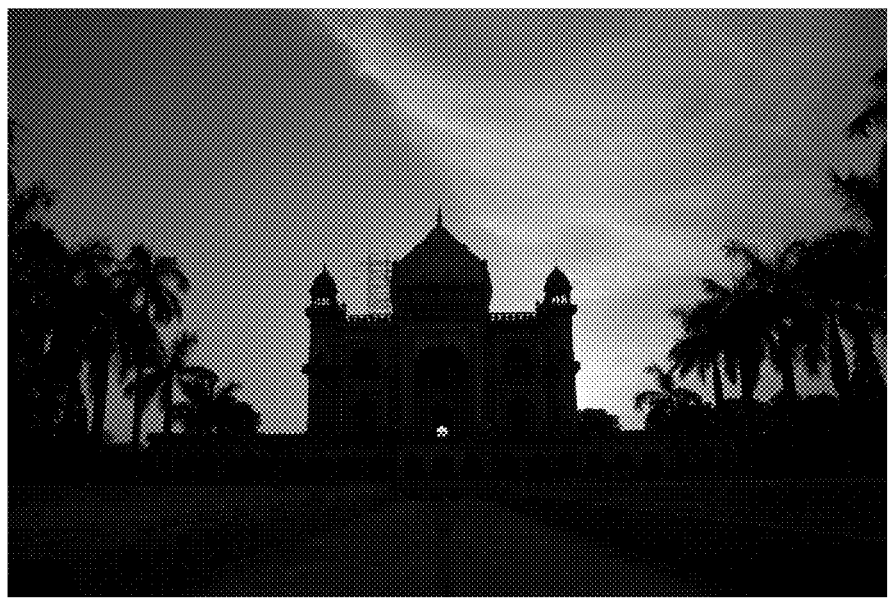
FIGS. 4A-4J illustrate an example of seamless image composition, according to some embodiments.
Figure 4B:
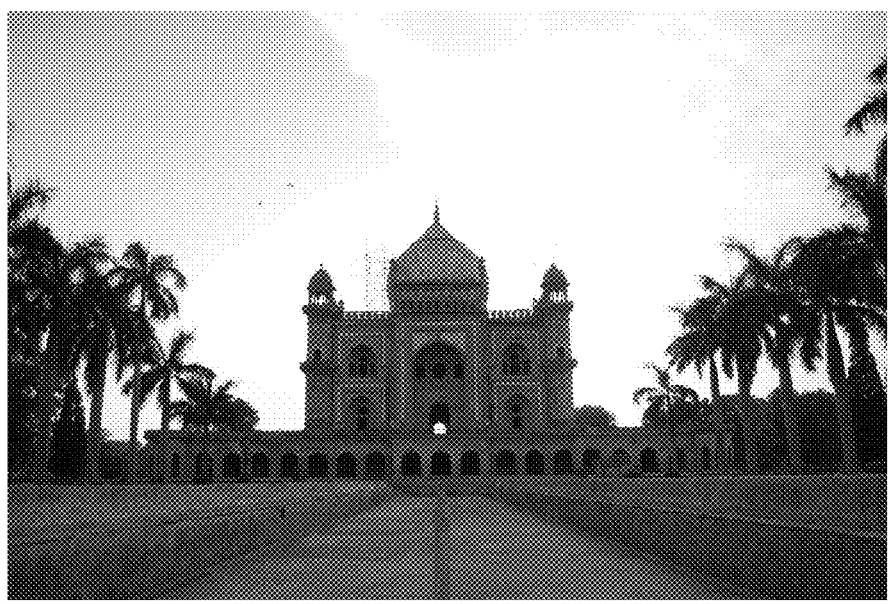
Figure 4C:
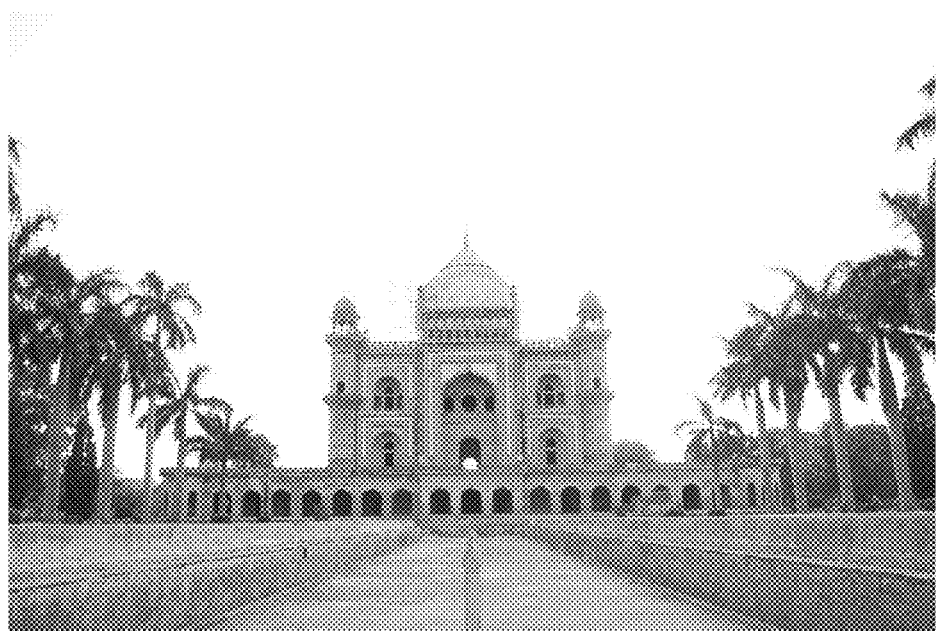

Turning now to FIG. 4, three input images, FIGS. 4A-4C, have been received. FIGS. 4A-4C are an example of HDR photography situation including underexposed, mean-exposed, and overexposed images of the same content. FIGS. 4A-4C were taken at −2 EV, 0 EV, and +2 EV, respectively.

Figure 4D:
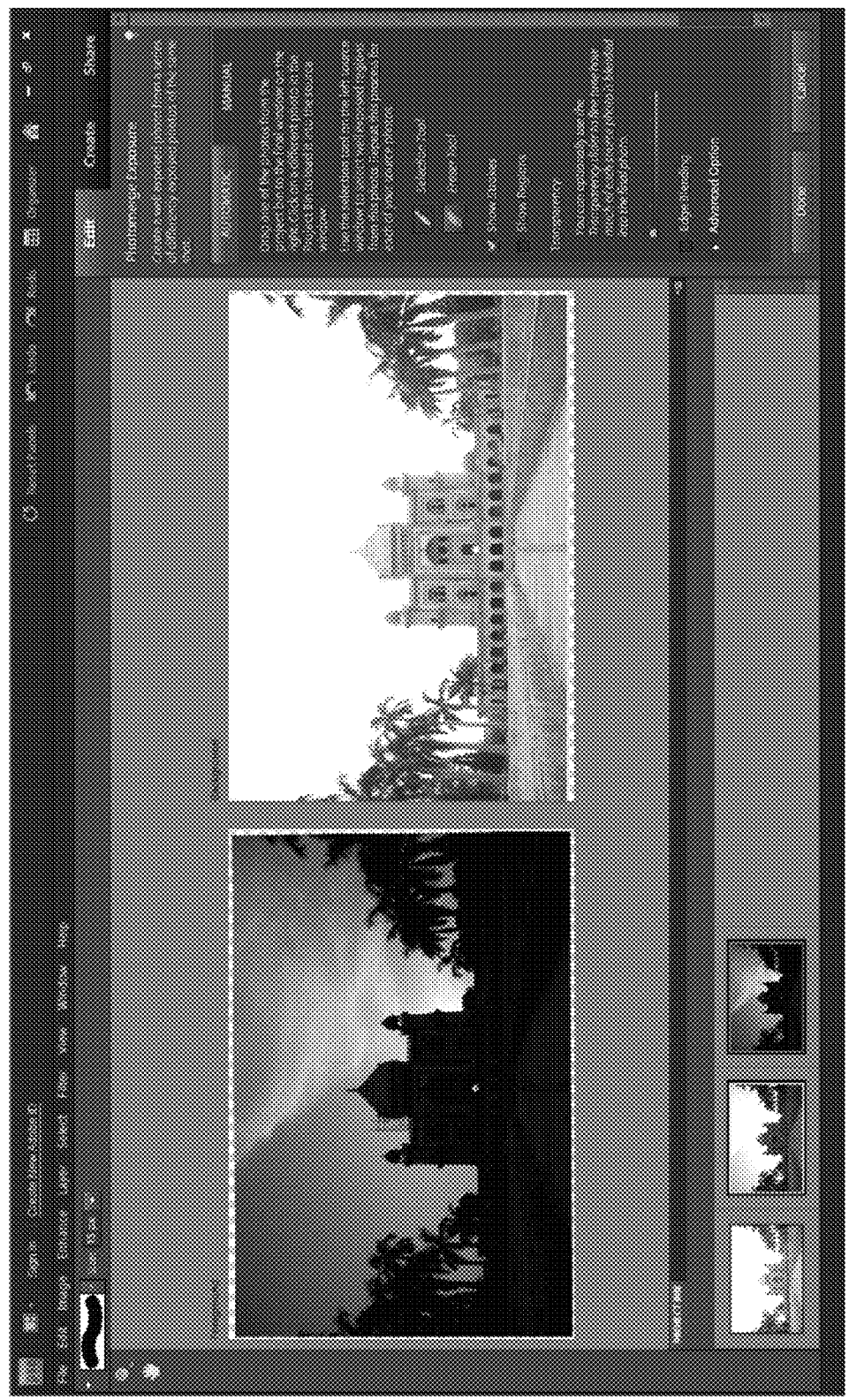
Figure 4E:
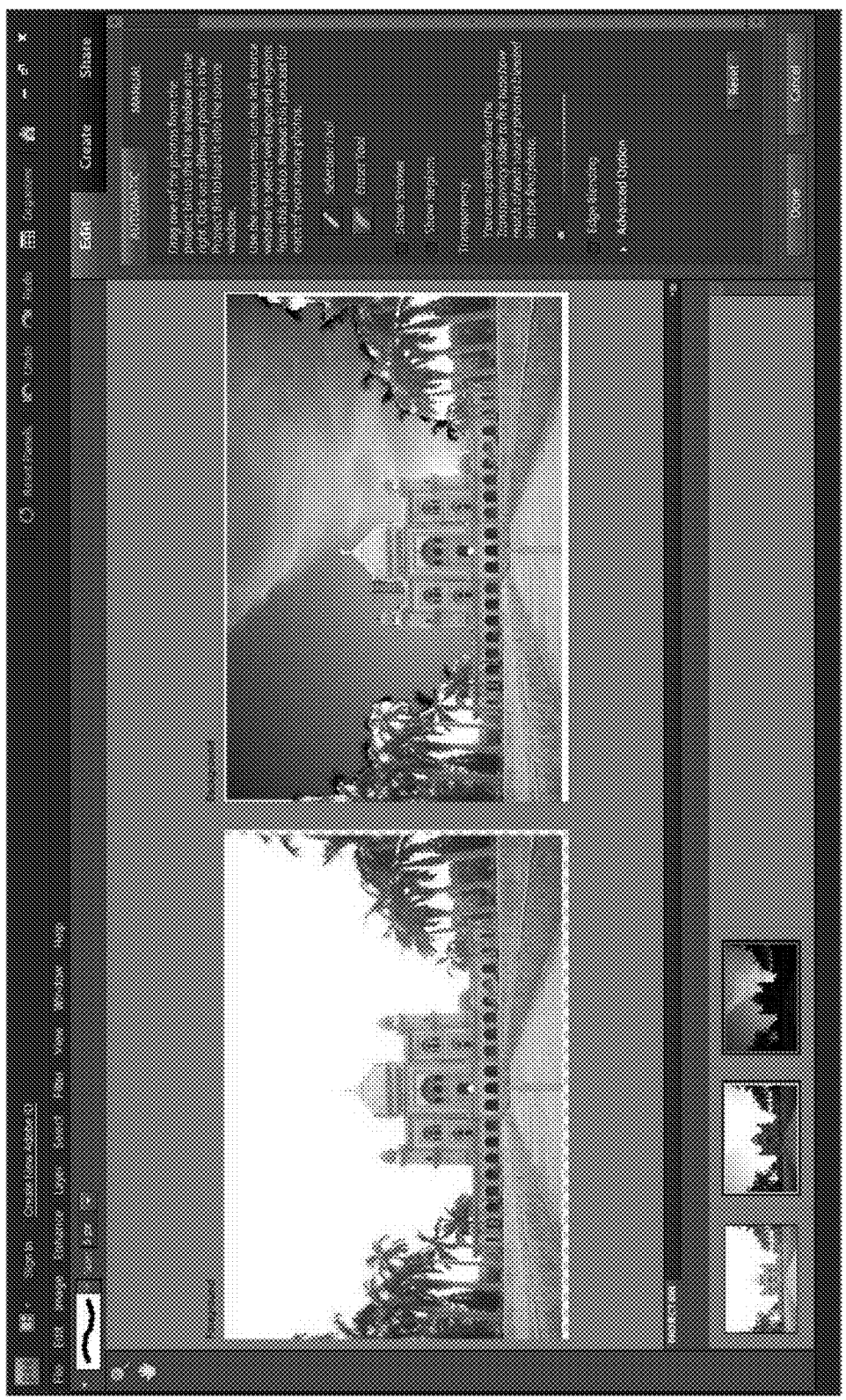
Figure 4F:
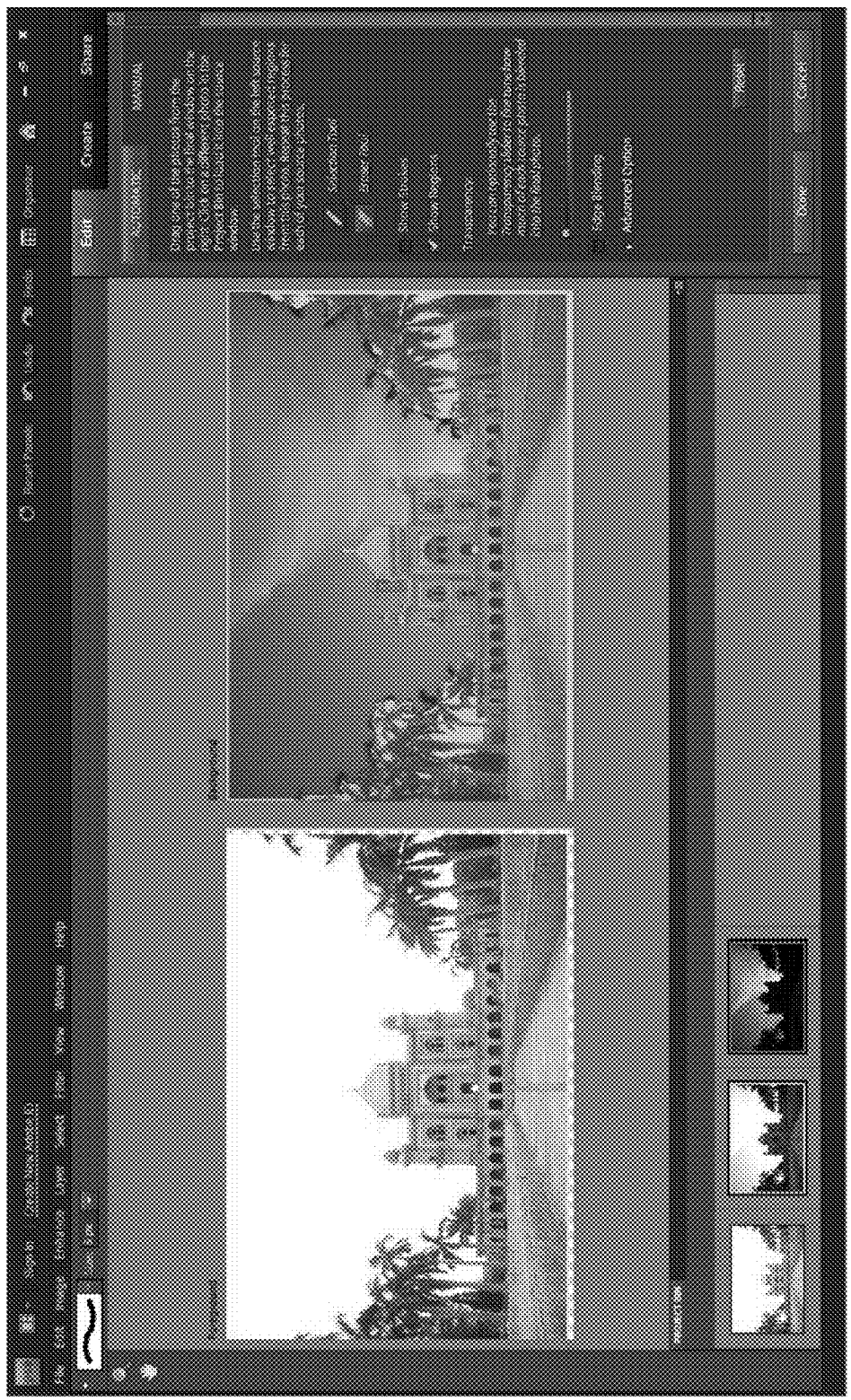
Figure 4G:
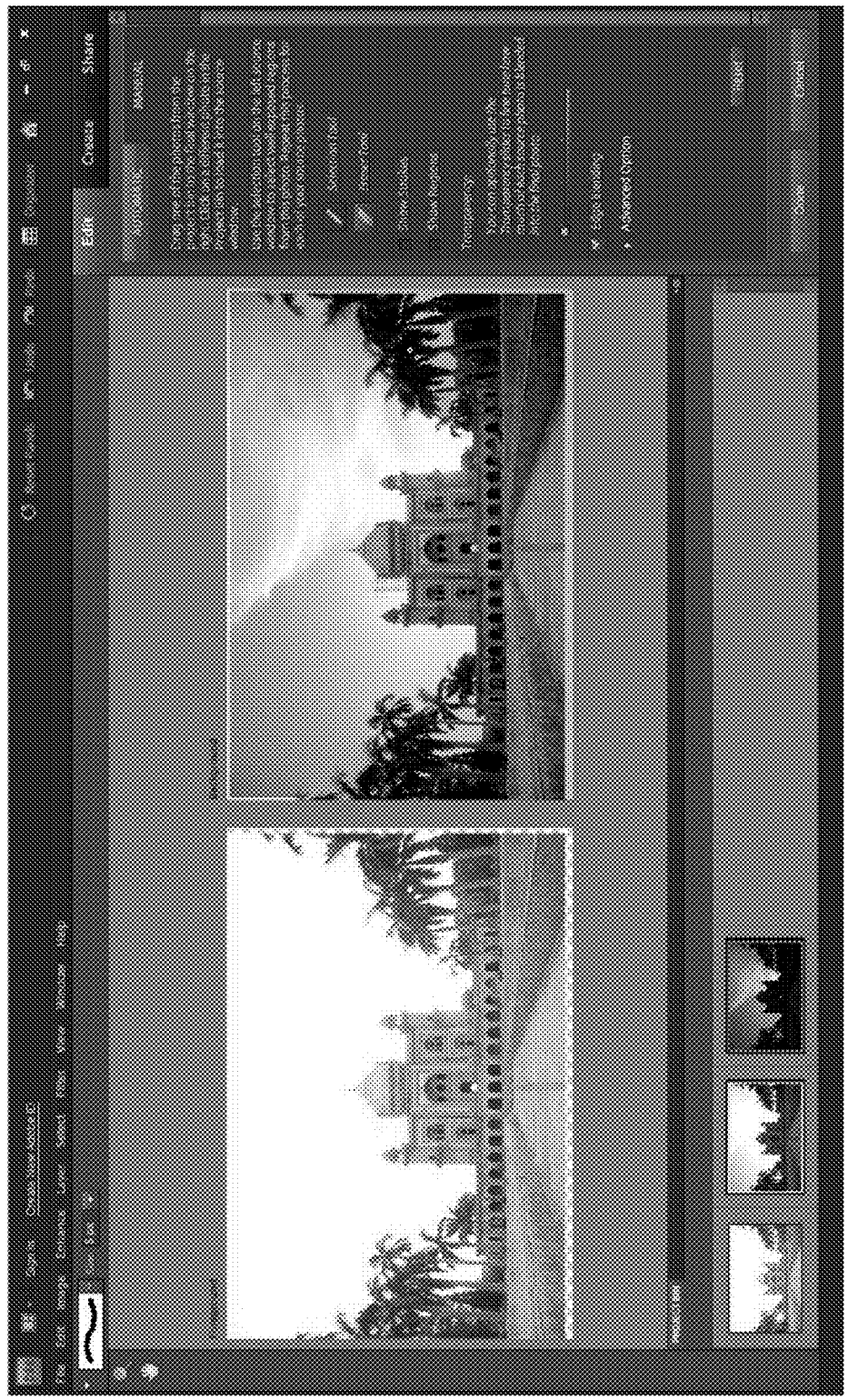
Figure 4H:
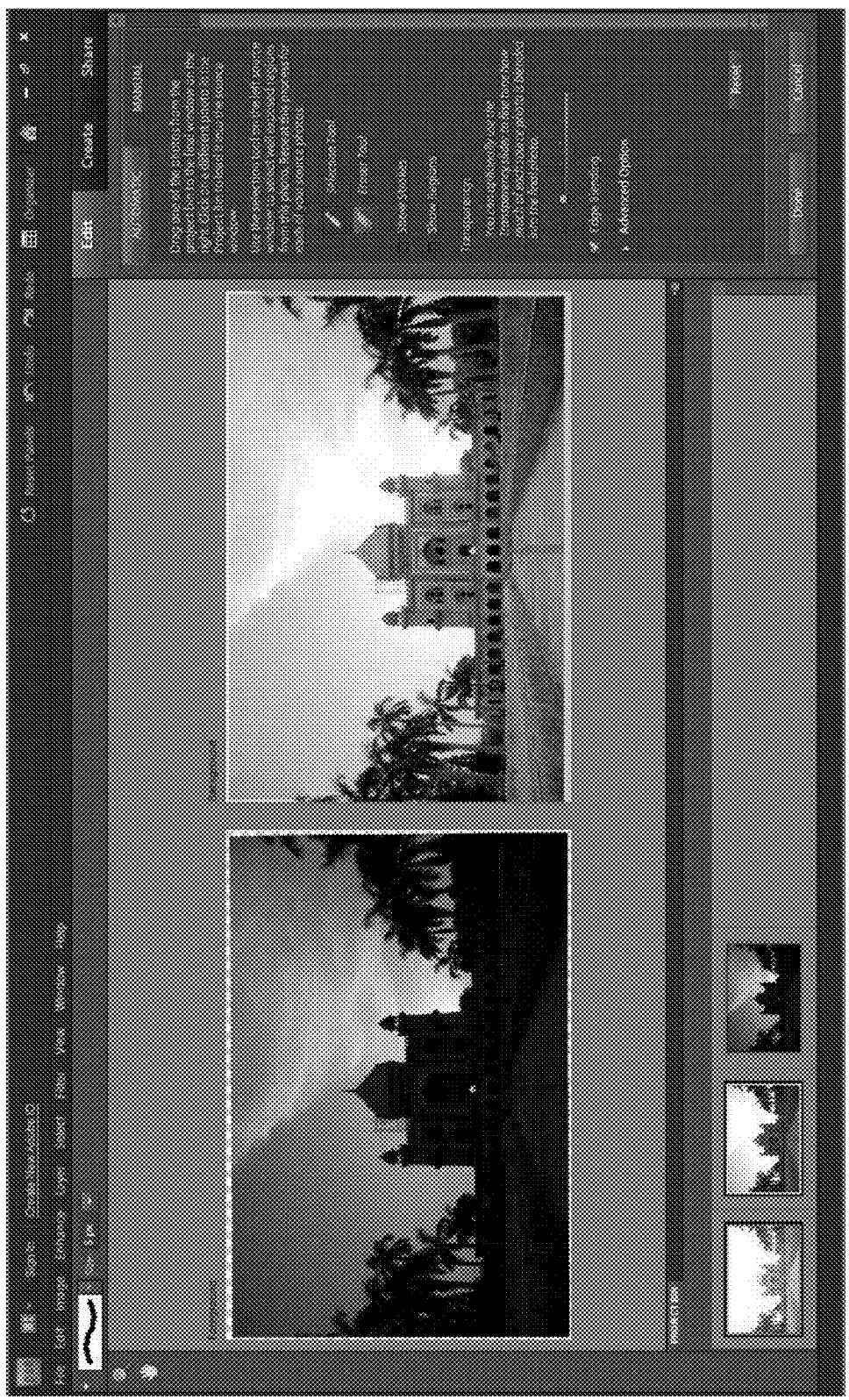
Figure 4I:
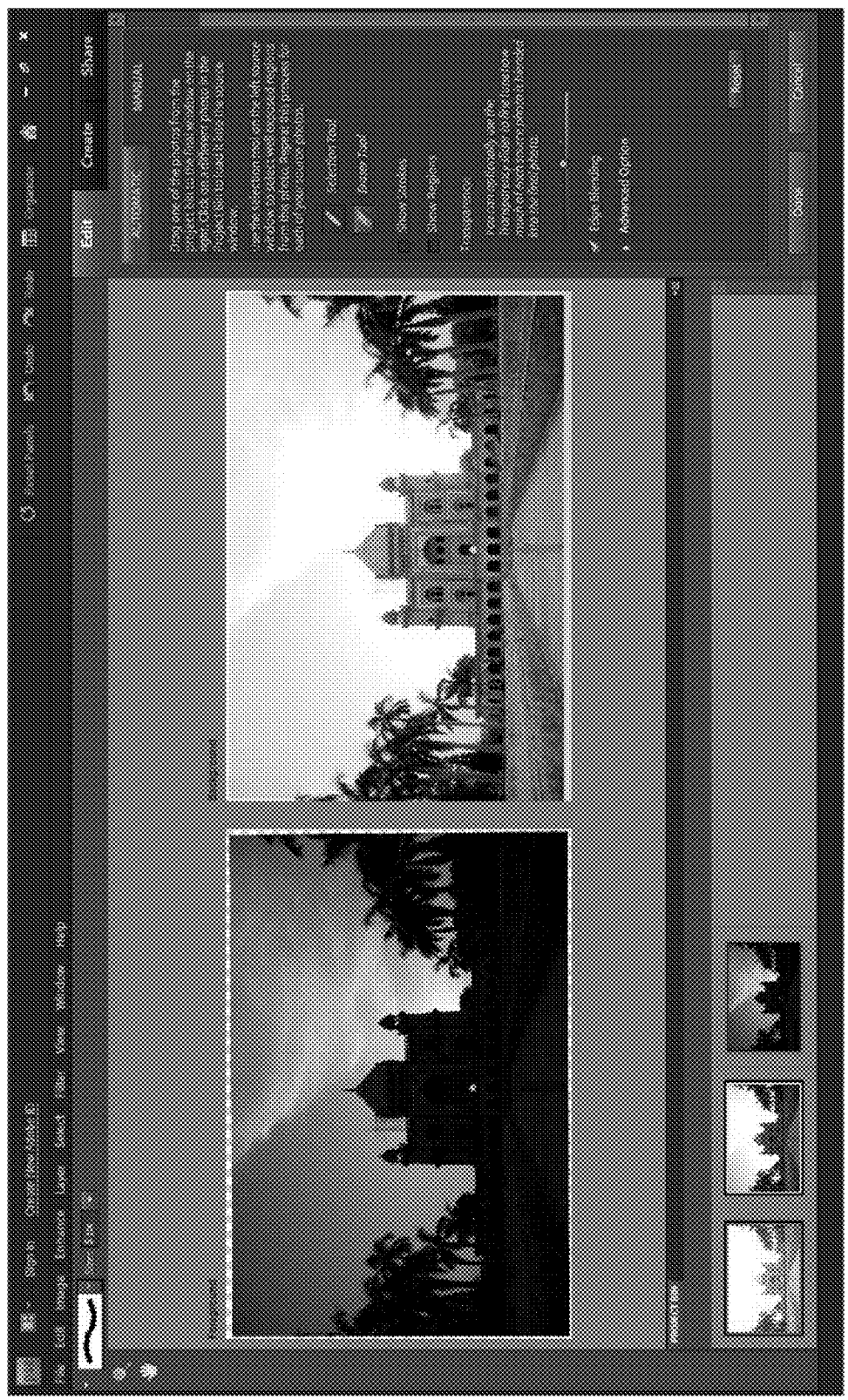
Figure 4J:
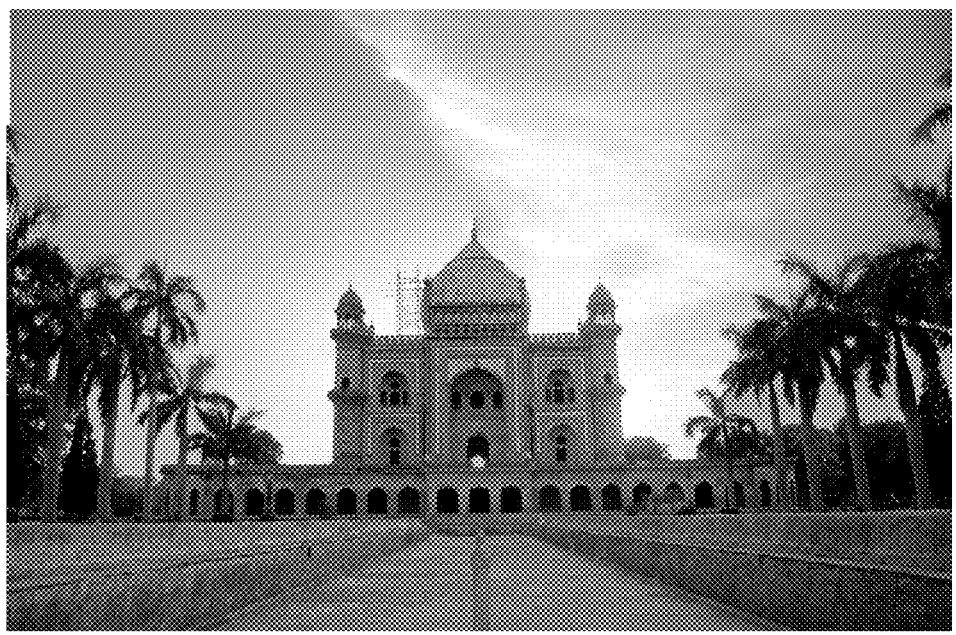
Figure 5A:
FIGS. 5A-5D illustrate another example of seamless image composition, according to some embodiments.

FIG. 4D illustrates the foreground and background images being selected from the choice of the three input images seen in the project bin. FIG. 4E further illustrates the sky being selected from the foreground image. Note that the composite image on the right (labeled Background—the sky from the foreground has been composited on the base image) is poor. It exhibits hard edges (seams) that are evident at the selection boundaries. In FIG. 4F, the label map, which maps each pixel in the composite image to its one or more corresponding source image in the plurality of images, indicates the sky being selected from the foreground image. A shade or color (e.g., green) may denote the selected region (e.g., the sky). FIG. 4G illustrates the results after edge blending is selected on. The hard edges/seams are dissolved and spread across the image. FIGS. 4H and 4I illustrate edge blending with blend parameters (transparency of selection) of 25% and 50%. FIG. 4J illustrates the composite image produced with a blend parameter of 50%.

Figure 5B:
Figure 5C:
Figure 5D:

FIGS. 5A-5D illustrate another example of seamless image composition, according to some embodiments. The example uses two input images, one taken with a flash to expose the foreground and one without. FIG. 5A shows two images, on the left is the source image and on the right is the composite image. Note that the second input image in this example, which is the base image, is not shown. The image on the left in FIG. 5A illustrates the selection of the woman from the foreground of that image. The selection may be a vertical line, an outline around the selected region, a color or shade, etc. FIG. 5B illustrates the label map having selected the woman from the foreground image. Note the shading or coloring (e.g., blue) denoting the selected region. FIG. 5C illustrates a composite image with a blend parameter of 25% transparency. FIG. 5D illustrates a composite image with 25% transparency and with edge blending turned on. Note the hard edges may be dissolved and spread across the image.

Example Implementations

Figure 6:
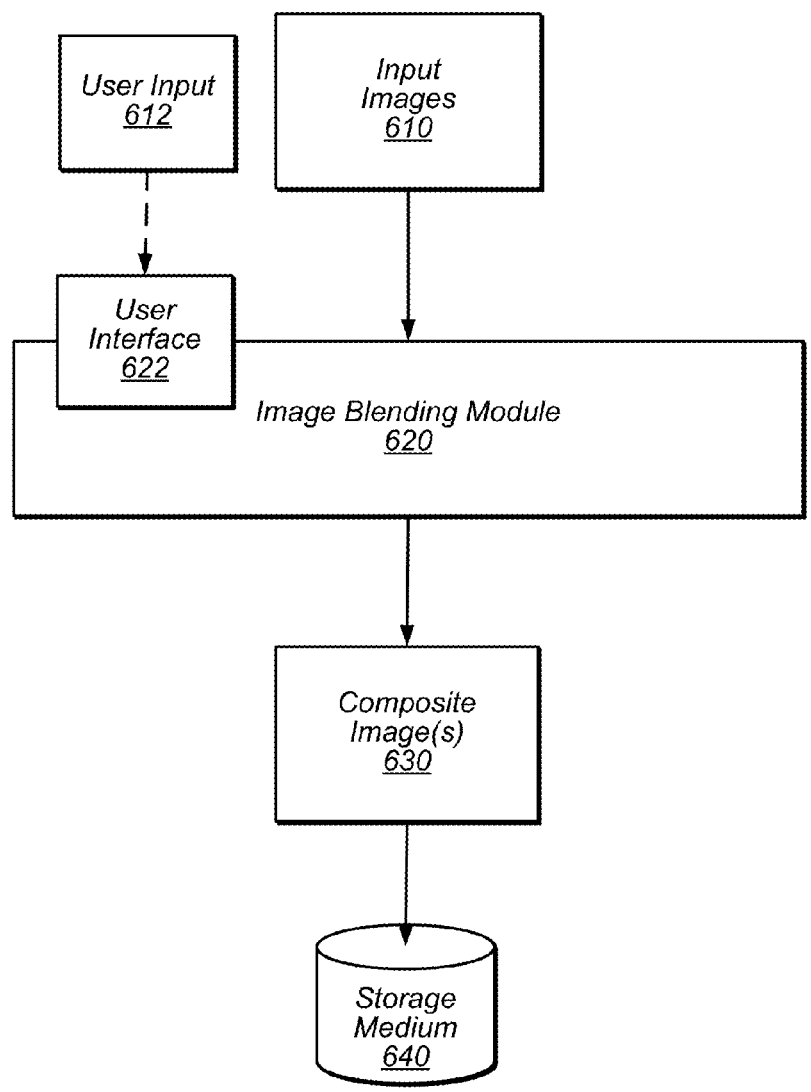
FIG. 6 illustrates a module that may implement seamless image composition, according to some embodiments.
Figure 7:
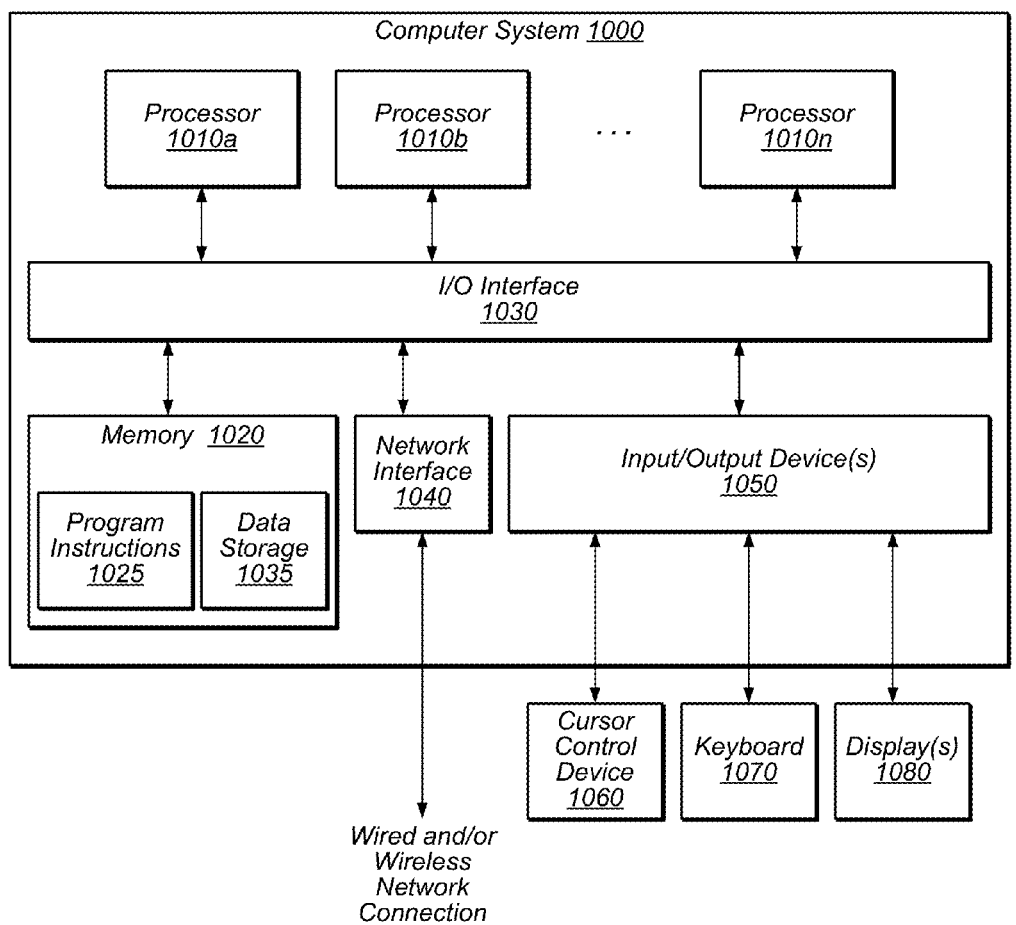
FIG. 7 illustrates an example computer system that may be used in embodiments.

FIG. 6 illustrates an example image blending module 620 that may implement image blending methods and workflows as illustrated in FIGS. 1 through 5D. Embodiments of an image blending module 620 may, for example, be implemented as a stand-alone image processing application, as a module of an image processing application, as a plug-in for applications including image processing applications, and/or as a library function or functions that may be called by other applications. Embodiments of image blending module 620 may be implemented in any image processing application. FIG. 7 illustrates an example computer system on which embodiments of image blending module 620 may be implemented.

Image blending module 620 may receive, as input, a plurality of images 610. Examples of input images are shown in FIGS. 4A-C. Image blending module 620 may facilitate workflows and methods as described herein for blending input images 610 thereby creating seamless composite images. In some embodiments, the image blending module 620 may receive user input 612 via user interface 622. An example user interface 622 to an image blending module 620, and an example of an image blending workflow to blend an example set of images, is illustrated in FIGS. 4D-4I as well as in FIGS. 5A-5C. Image blending module 620 may generate as output one or more composite images 630. Example composite images are shown in FIGS. 3A-3B, 4J, and 5D. A composite image 630 may, for example, be printed, displayed on a display device, transmitted to other computer systems via wired or wireless communication media, and/or stored to a storage medium 640, such as system memory, a disk drive, DVD, CD, etc. A composite image 630 may be further processed according to the image blending methods described herein, and/or may be further processed according to other image processing methods and techniques.

Program instructions and/or data for implementing embodiments of an image blending module as described herein may, for example, be stored on a computer-readable storage medium. A computer-readable storage medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc.

Example System

Embodiments of an image blending module as described herein may be executed on one or more computer systems, which may interact with various other devices. One such computer system is illustrated by FIG. 7. In various embodiments, computer system 700 may be any of various types of devices, including, but not limited to, a personal computer system, desktop computer, laptop, notebook, or netbook computer, mainframe computer system, handheld computer, workstation, network computer, a camera, a set top box, a mobile device, tablet device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of an image blending module are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 7, memory 1020 may include program instructions 1025, configured to implement embodiments of an image blending module as described herein, and data storage 1035, comprising various data accessible by program instructions 1025. In one embodiment, program instructions 1025 may include software elements of embodiments of an image blending module as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of an image blending module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the disclosed embodiments may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof The order of method may be changed, and various elements may be added, reordered, combined, omitted, modified, etc.

Various modifications and changes may be made as would be obvious to a person skilled in the art having the benefit of this disclosure. It is intended that the embodiments embrace all such modifications and changes and, accordingly, the above description to be regarded in an illustrative rather than a restrictive sense.

What is claimed is:
1. A method, comprising:
receiving a plurality of images;
receiving an indication of one of the plurality of images as a base image, wherein the remaining not indicated images comprise one or more source images;
receiving a selection of one or more regions of the one or more source images to be copied onto the base image;
receiving input setting a blend parameter for each of the selected regions, wherein the blend parameter for each selected region includes a blend amount for the selected region; and
blending the plurality of images together into a composite image, wherein said blending comprises matching image gradients across one or more seams of the composite image, wherein the image gradients are based on the blend parameters,
wherein said blending further comprises:
storing image data in a buffer for each of the plurality of images;
storing a blend map for each of the selected regions based on each selected region's corresponding blend parameter;
computing modified image data based on the stored image data and stored blend maps for each of the selected regions;

computing a composite vector field that includes an image gradient for: the base image, each region of the modified image data, and a plurality of boundaries that exist at a plurality of regions of the modified image data; and generating composite image data, wherein said generating includes matching a plurality of gradients of the composite image to the composite vector field.

2. The method of claim 1, further comprising:

receiving input setting a modified blend parameter for at least one of the selected regions, wherein the modified blend parameter comprises a modified blend amount for the at least one of the selected regions; and re-blending the plurality of images together into the composite image, wherein said re-blending comprises matching image gradients of the plurality of images across one or more seams of the composite image, wherein the image gradient corresponding to the at least one selected region is based on the modified blend parameter.

3. The method of claim 1, wherein said generating includes matching the plurality of gradients of the composite image to the composite vector field in a least squares sense.

4. The method of claim 1, wherein each one of the plurality of gradients of the composite image corresponds to a region of the composite image and is computed from a corresponding source image, wherein the corresponding source image for each one of the plurality of gradients is one of the one or more source images for regions of the composite image derived from the one of the one or more source images and is the base image for regions of the composite image derived from the base image.

5. The method of claim 1, wherein one of the plurality of gradients lies at a boundary between two regions of the composite image, wherein the one of the plurality of gradients is computed by averaging gradients of two or more of the plurality of images forming the boundary.

6. The method of claim 1, wherein one of the plurality of gradients corresponds to a region of the composite image composed of multiple source images, wherein the one of the plurality of gradients is computed from the modified image.

7. A non-transitory computer-readable storage medium storing program instructions, wherein the program instructions are computer-executable to implement:

receiving a plurality of images;

receiving an indication of one of the plurality of images as a base image, wherein the remaining not indicated images comprise one or more source images;

receiving a selection of one or more regions of the one or more source images to be copied onto the base image;

receiving input setting a blend parameter for each of the selected regions, wherein the blend parameter for each selected region includes a blend amount for the selected region; and blending the plurality of images together into a composite image, wherein said blending comprises matching image gradients across one or more seams of the composite image, wherein the image gradients are based on the blend parameters, wherein the program instructions are further computer-executable to implement:

storing image data in a buffer for each of the plurality of images;

storing a blend map for each of the selected regions based on each selected region's corresponding blend parameter;

computing modified image data based on the stored image data and stored blend maps for each of the selected regions;

computing a composite vector field that includes an image gradient for: the base image, each region of the modified image data, and a plurality of boundaries that exist at a plurality of regions of the modified image data;

and generating composite image data, wherein said generating includes matching a plurality of gradients of the composite image to the composite vector field.

8. The non-transitory computer-readable storage medium of claim 7, wherein the program instructions are further computer-executable to implement:

receiving input setting a modified blend parameter for at least one of the selected regions, wherein the modified blend parameter comprises a modified blend amount for the at least one of the selected regions; and re-blending the plurality of images together into the composite image, wherein said re-blending comprises matching image gradients of the plurality of images across one or more seams of the composite image, wherein the image gradient corresponding to the at least one selected region is based on the modified blend parameter.

9. The non-transitory computer-readable storage medium of claim 7, wherein said generating includes matching the plurality of gradients of the composite image to the composite vector field in a least squares sense.

10. The non-transitory computer-readable storage medium of claim 7, wherein each one of the plurality of gradients of the composite image corresponds to a region of the composite image and is computed from a corresponding source image, wherein each corresponding source image is one of the one or more source images for regions of the composite image derived from the one of the one or more source images and is the base image for regions of the composite image derived from the base image.

11. The non-transitory computer-readable storage medium of claim 7, wherein one of the plurality of gradients lies at a boundary between two regions of the composite image, wherein the one of the plurality of gradients is computed by averaging gradients of two or more of the plurality of images forming the boundary.

12. The non-transitory computer-readable storage medium of claim 7, wherein one of the plurality of gradients corresponds to a region of the composite image composed of multiple source images, wherein the one of the plurality of gradients is computed from the modified image.

13. A system, comprising:

at least one processor; and a memory comprising program instructions, wherein the program instructions are executable by the at least one processor to:

receive a plurality of images;

receive an indication of one of the plurality of images as a base image, wherein the remaining not indicated images comprise one or more source images;

receive a selection of one or more regions of the one or more source images to be copied onto the base image;

receive input to set a blend parameter for each of the selected regions, wherein the blend parameter for each selected region includes a blend amount for the selected region; and blend the plurality of images together into a composite image, wherein said blending comprises matching image gradients across one or more seams of the composite image, wherein the image gradients are based on the blend parameters, wherein the program instructions are further executable by the at least one processor to:

store image data in a buffer for each of the plurality of images;

store a blend map for each of the selected regions based on each selected region's corresponding blend parameter;

compute modified image data based on the stored image data and stored blend maps for each of the selected regions;

compute a composite vector field that includes an image gradient for: the base image, each region of the modified image data, and a plurality of boundaries that exist at a plurality of regions of the modified image data;

and generate composite image data, wherein said generating includes matching a plurality of gradients of the composite image to the composite vector field.

14. The system of claim 13, wherein the program instructions are further executable by the at least one processor to:

receive input to set a modified blend parameter for at least one of the selected regions, wherein the modified blend parameter comprises a modified blend amount for the at least one of the selected regions; and re-blend the plurality of images together into the composite image, wherein said re-blending comprises matching image gradients of the plurality of images across one or more seams of the composite image, wherein the image gradient corresponding to the at least one selected region is based on the modified blend parameter.

15. The system of claim 13, wherein said generating includes matching the plurality of gradients of the composite image to the composite vector field in a least squares sense.

16. The system of claim 13, wherein each one of the plurality of gradients of the composite image corresponds to a region of the composite image and is computed from a corresponding source image, wherein each corresponding source image is one of the one or more source images for regions of the composite image derived from the one of the one or more source images and is the base image for regions of the composite image derived from the base image.

17. The system of claim 13, wherein one of the plurality of gradients lies at a boundary between two regions of the composite image, wherein the one of the plurality of gradients is computed by averaging gradients of two or more of the plurality of images forming the boundary.

18. The system of claim 13, wherein one of the plurality of gradients corresponds to a region of the composite image composed of multiple source images, wherein the one of the plurality of gradients is computed from the modified image.

* * * * *